(12) United States Patent
Chen et al.

(10) Patent No.: US 8,613,047 B2
(45) Date of Patent: Dec. 17, 2013

(54) INTERACTING WITH INTERNET SERVERS WITHOUT KEYBOARD

(75) Inventors: Yong-Chang Chen, Banchiau (TW); Howard (Ping-Chia) Su, Wujie Township (TW); Jyun-Jie (James) Yan, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 520 days.

(21) Appl. No.: 12/427,676

(22) Filed: Apr. 21, 2009

(65) Prior Publication Data

US 2010/0269165 A1  Oct. 21, 2010

(51) Int. Cl.
*G06F 21/20* (2006.01)

(52) U.S. Cl.
USPC .............. 726/3; 726/2; 726/4; 726/5; 726/16; 726/17; 726/21

(58) Field of Classification Search
None
See application file for complete search history.

(56) References Cited

U.S. PATENT DOCUMENTS

| | | | |
|---|---|---|---|
| 6,785,418 B1 * | 8/2004 | Barton et al. | 382/186 |
| 7,106,845 B1 * | 9/2006 | Zhuk et al. | 379/207.11 |
| 2002/0168107 A1 * | 11/2002 | Tang et al. | 382/187 |
| 2004/0123151 A1 * | 6/2004 | Mizrah | 713/201 |
| 2004/0208376 A1 * | 10/2004 | Shi et al. | 382/218 |
| 2006/0173560 A1 * | 8/2006 | Widrow | 700/48 |
| 2007/0042806 A1 * | 2/2007 | Stepanian | 455/557 |
| 2008/0098464 A1 * | 4/2008 | Mizrah | 726/5 |
| 2008/0103972 A1 * | 5/2008 | Lanc | 705/44 |
| 2008/0235788 A1 * | 9/2008 | El Saddik et al. | 726/18 |
| 2009/0172810 A1 * | 7/2009 | Won et al. | 726/19 |
| 2009/0210939 A1 * | 8/2009 | Xu et al. | 726/19 |
| 2009/0295737 A1 * | 12/2009 | Goldsmith et al. | 345/169 |

* cited by examiner

*Primary Examiner* — Techane Gergiso
*Assistant Examiner* — Adrian Stoica
(74) *Attorney, Agent, or Firm* — Pillsbury Winthrop Shaw Pittman

(57) ABSTRACT

A system and method which may allow users to interact with Internet servers with graphical mouse movements. The invention is especially useful to enhance online transaction security. A user may use a mouse to draw a pattern and store the pattern as his password to an online account, and draw the pattern with a mouse to log in the online account. The password may include a drawing, one or more letters, one or more numbers, or one or more characters.

In an embodiment, a computer program product may include a computer-readable medium having instructions which, when performed by a computer, perform a user authentication method. The user authentication method may include receiving at an Internet server a username; receiving at the Internet server a password which is drawn with graphical movements of a graphical drawing input device; determining whether the password drawn matches a password previously stored with the username; and authenticating a user accordingly.

20 Claims, 6 Drawing Sheets

INTERACTING WITH INTERNET SERVERS WITHOUT KEYBOARD

BACKGROUND

1. Field of the Invention

The present invention relates generally to computer input methods, and more specifically to a computer input method for avoiding keyloggers.

2. Description of Related Art

The explosive growth of the Internet makes life much easier. Users may do online shopping and manage bank accounts from home. A user may use a username and password to protect his online accounts, and type them in with a keyboard to login to his accounts. The user may also use a keyboard to input his credit card number and other confidential information. However, the typical keyboard entered information is subject to interception easily, and online identity theft by keyloggers compromises security of online transactions.

Some users resort to additional hardware, e.g., a tablet or an RSA SecurID™ token, for enhanced security. However, on top of the extra cost, users have to carry the additional hardware with them all the time.

Therefore, it may be desirable to provide a system and method which may help users to prevent online identity theft without dedicated hardware devices.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

Aspects of the present invention provide a system and method which may allow users to interact with Internet servers with graphical mouse movements. The disclosed system and method are especially useful to enhance online transaction security. A user may use a mouse to draw a pattern and store the pattern as his password to an online account, and draw the pattern with a mouse to login to the online account. The password may include a drawing, one or more letters, one or more numbers, one or more characters, or a combination of any of these.

The invention may be used in other circumstances for users' convenience as well. A user may store a symbol drawn with a mouse as a representation of, or a shortcut for, an operation, e.g., P for "Printing," B for "Back" and 0 for "Log out." When a user uses his mouse to draw a symbol, its corresponding operation may be performed. A user may also input certain confidential information, e.g., credit card number, with mouse movements. The invention may be carried out by computer-executable instructions, such as program modules. Advantages of the present invention will become apparent from the following detailed description.

Figure 1:
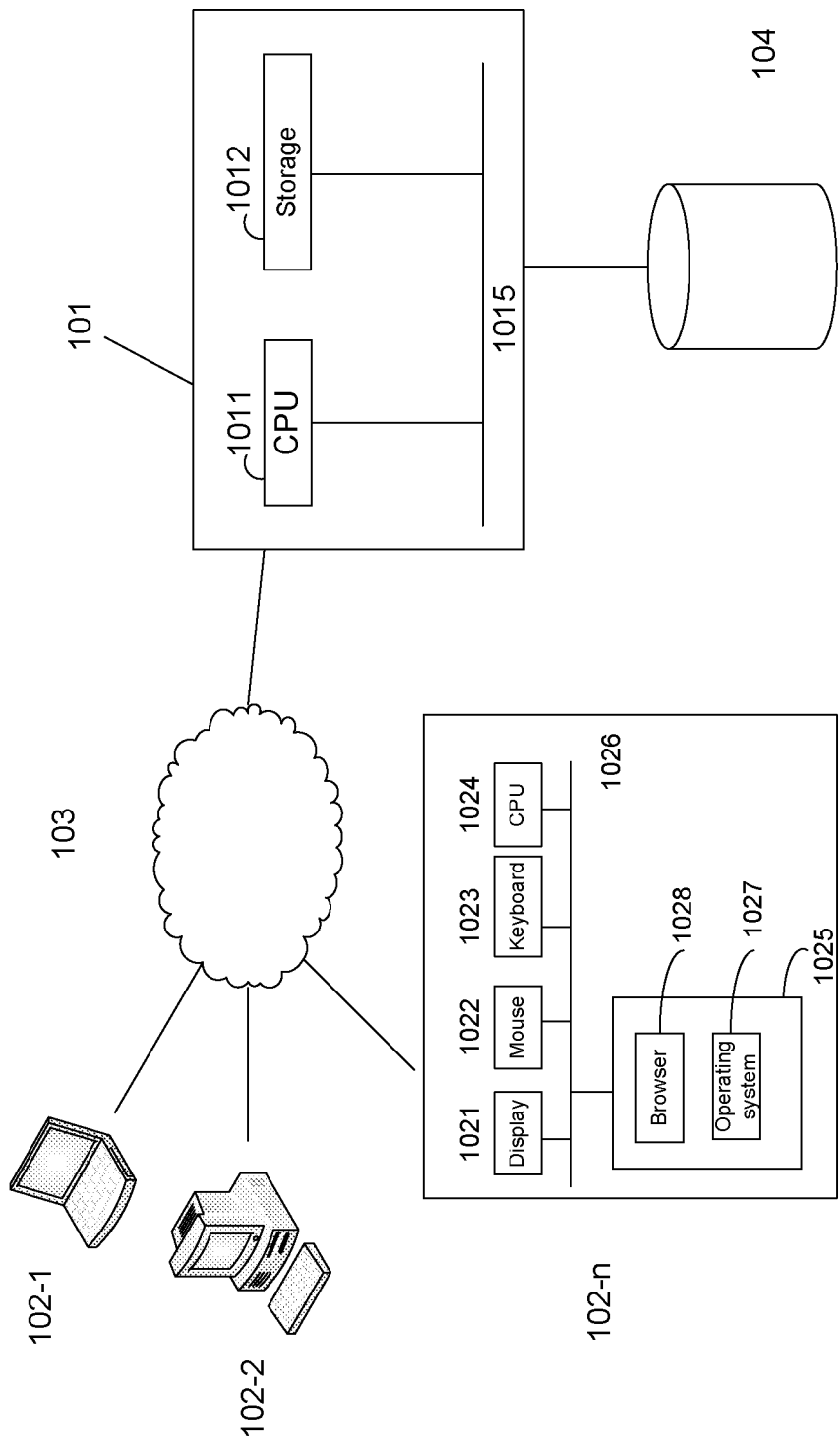
FIG. 1 illustrates an exemplary environment in which a system of the present invention may be used.

FIG. 1 illustrates an exemplary environment in which a system of the present invention may be used. As shown, an Internet server 101 may communicate over a network 103 with a number of user terminals 102-1, 102-2, . . . 102-n.

The computer network 103 may be, e.g., the Internet. Network connectivity may be wired or wireless, using one or more communications protocols, as will be known to those of ordinary skill in the art.

The user terminals 102 may be personal computers, laptop devices, or other consumer electronics using a mouse as an input device. Each user terminal may include one or more of a display 1021, a mouse 1022, a keyboard 1023, a processing unit 1024, storage devices 1025, and a system bus 1026 coupling various components in the computer system. An operating system 1027 of the user terminal may respond to a user input by managing tasks and internal system resources and processing system data. The mouse 1022 may be a Touchpad™ integrated in a laptop, or an external mouse which may transmit its movement data to a port in the user terminal via a cord, infrared radiation or radio. Additionally or alternatively, the mouse 1022 may be embodied in a trackball, a touchscreen display, trackpads or any other hardware implementation capable of translating physical motion to map cursor or pointer locations on the display 1021. In this context, the mouse 1022 may be any graphical drawing input device.

Each user terminal may have a browser application 1028 configured to receive and display web pages, which may include text, graphics, multimedia, etc. The web pages may be based on, e.g., HyperText Markup Language (HTML) or extensible markup language (XML). The browser application 1028 may also receive user input from the mouse 1022, e.g., graphical mouse movement, in the form of motion relative to a displayed web page, and forward the input data to the Internet server 101.

The Internet server 101 may be a computer system and may control the operation of a website, e.g., an online banking website. It may include a central processing unit (CPU) 1011 and a storage device 1012, which may communicate with each other and other parts in the computer system via a bus 1015. Alternatively, the Internet server 101 may include multiple computer systems each configured to accomplish certain tasks and coordinate with other computer systems to perform the method of the present invention.

The database 104 may store users' login information, e.g., a username and a password for each user.

Figure 2:
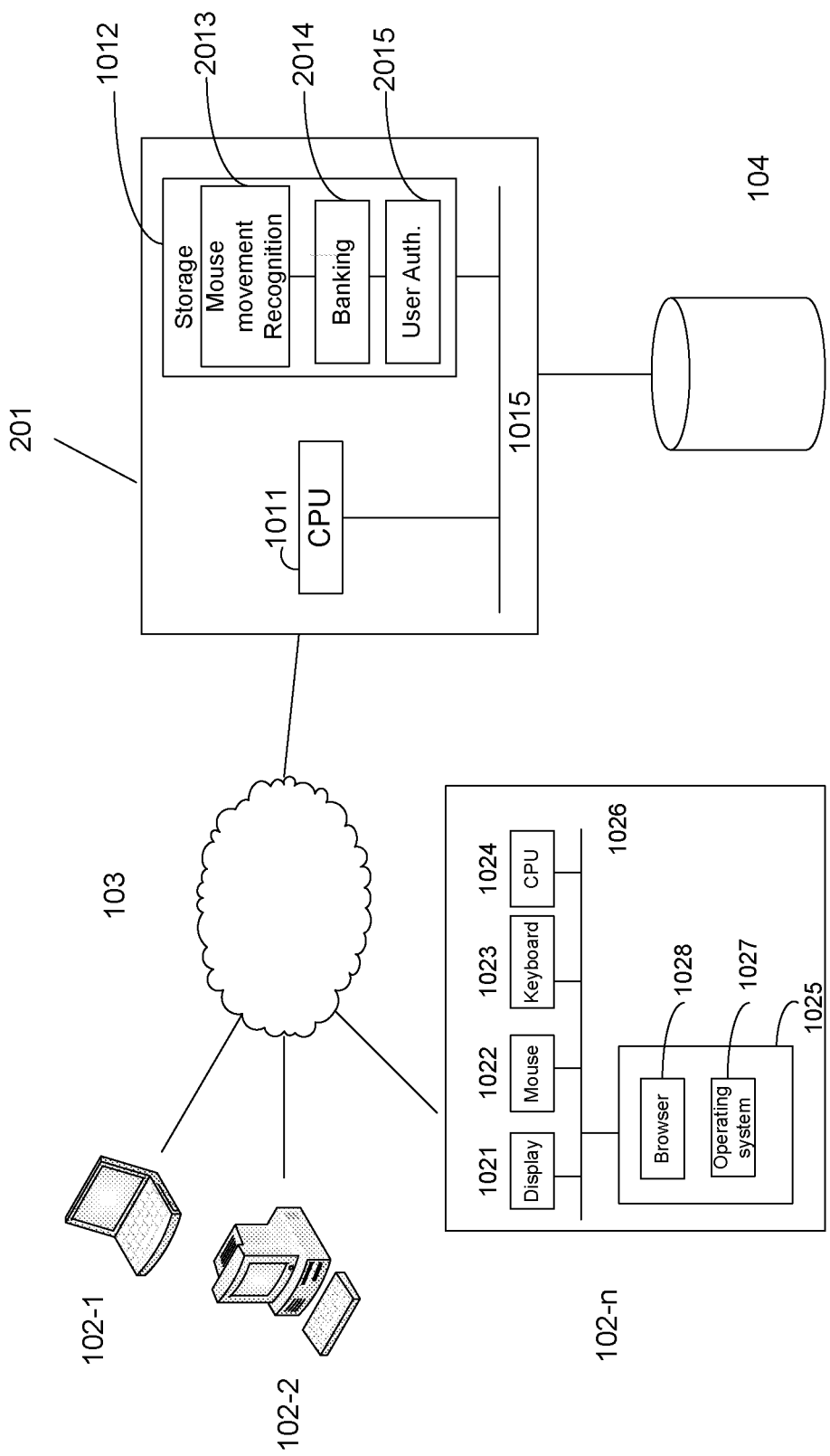
FIG. 2 illustrates a secured online system which may authenticate users via graphical mouse movements according to one embodiment of the present invention.

FIG. 2 illustrates a secured online system which may authenticate users via graphical mouse movements according to one embodiment of the present invention.

A mouse movement recognition module 2013, a banking module 2014 and a user authentication module 2015 may be stored in the storage device 1012. The CPU 1011 may execute computer software modules stored in the storage device 1012 to carry out a number of processes, including but not limited to the one described below with reference to FIG. 3. When a user opens a login page to gain access to the online banking system, the CPU 1011 may execute the mouse movement recognition module 2014 to receive graphical mouse movement data from a user terminal 102n, and execute the user authentication module 2015 to determine whether the graphical mouse movements match a pattern previously stored as a password by the user in a database 104, and authenticate the user accordingly. Although only one storage device 1012 is shown, it should be understood that the mouse movement recognition module 2013 may be stored in multiple storage devices, in one or more Internet servers 201.

The password stored in the database 104 may include a drawing, one or more letters, one or more numbers and/or one or more characters.

Figure 3:
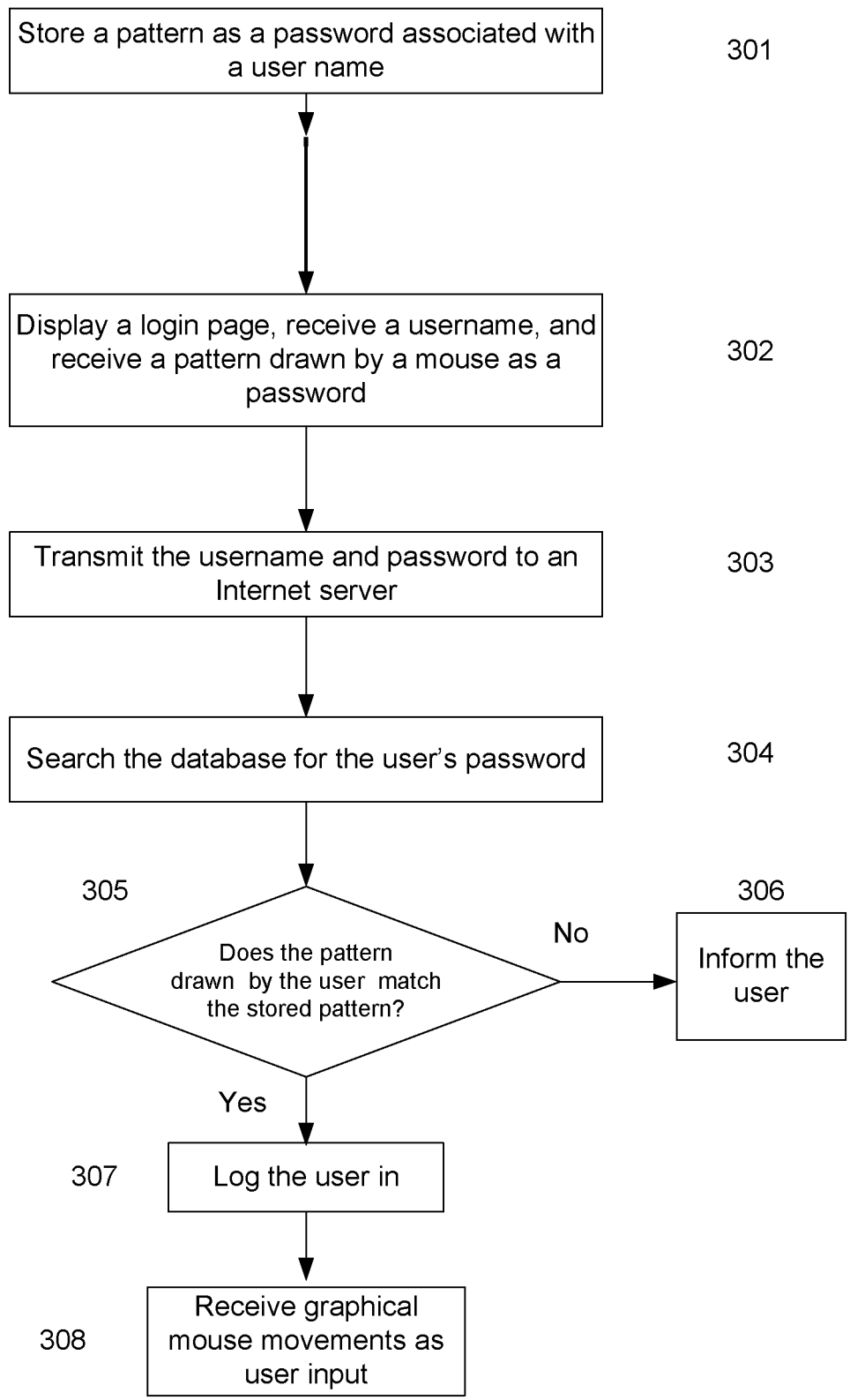
FIG. 3 illustrates a flow chart of a method for authenticating users of a secured online system via graphical mouse movements according to one embodiment of the present invention.

FIG. 3 illustrates a flow chart of a method for authenticating users of a secured online system via graphical mouse movements according to one embodiment of the present invention. The method may be used in the secured online system shown in FIG. 2.

Figure 4A:
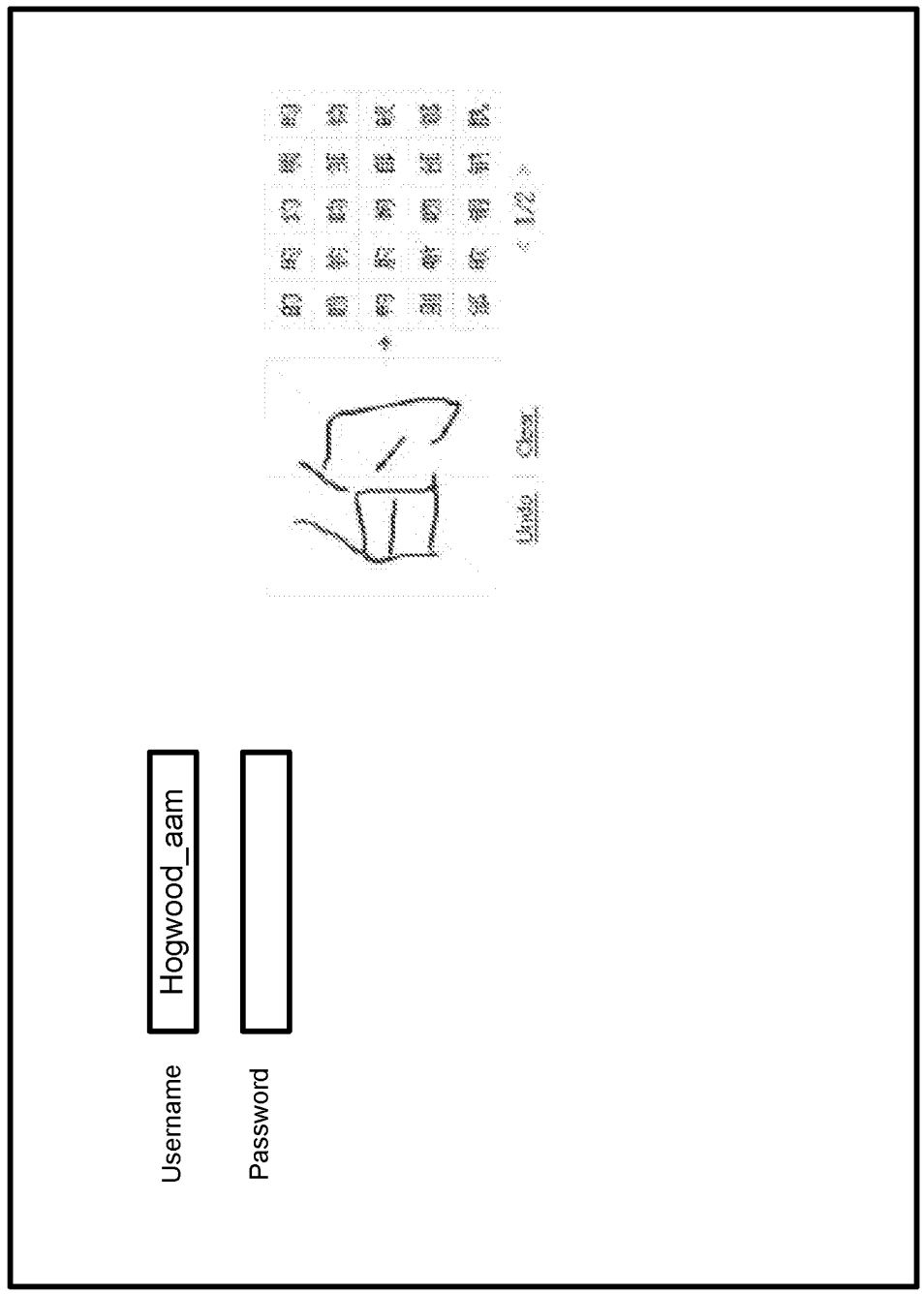
FIGS. 4A and 4B illustrate examples of passwords used in a secured online system according to one embodiment of the present invention.

At 301, a user may sign up for a secured online service provided by the server 201, e.g., opening an online bank account. The user may open a sign up page and store a username and a password for the account. The password may include a drawing, one or more letters, one or more numbers, and/or one or more characters. In one embodiment, a user may want to use a Chinese character as the password. As shown in FIG. 4A, when he finishes writing the Chinese character by moving his mouse, the Internet server 201, or more specifically, the mouse movement recognition module 2013, may provide a number of Chinese characters which are similar to what the user drew using the mouse, and the user may select one and store it in the database 104 as his password.

At 302, the user may want to login to his online account. He may open a login page to the online banking system at a user terminal 102n and input his username and password. Instead of using a keyboard, the user may use his mouse to input his password. The user may draw a pattern with his mouse, e.g., on a mouse pad.

At 303, the mouse movement recognition module 2013 may receive the username and password transmitted by the browser application 1028. When the password is a character, the mouse movement recognition module 2013 may determine which character the user has written with his mouse and provide the information to the user authentication module 2015.

At 304, the user authentication module 2015 may use the username to search the database 104 for the pattern the user stored as his password.

At 305, the user authentication module 2015 may determine whether the pattern drawn by the user with graphical mouse movements matches the stored password.

In the embodiment shown in FIG. 4A, the user authentication module 2015 may determine whether the Chinese character the user has just written with his mouse is the same character previously stored as the password. In some embodiments, the user may be authenticated as long as he wrote the same Chinese character, even if it is in a different style.

Figure 4B:
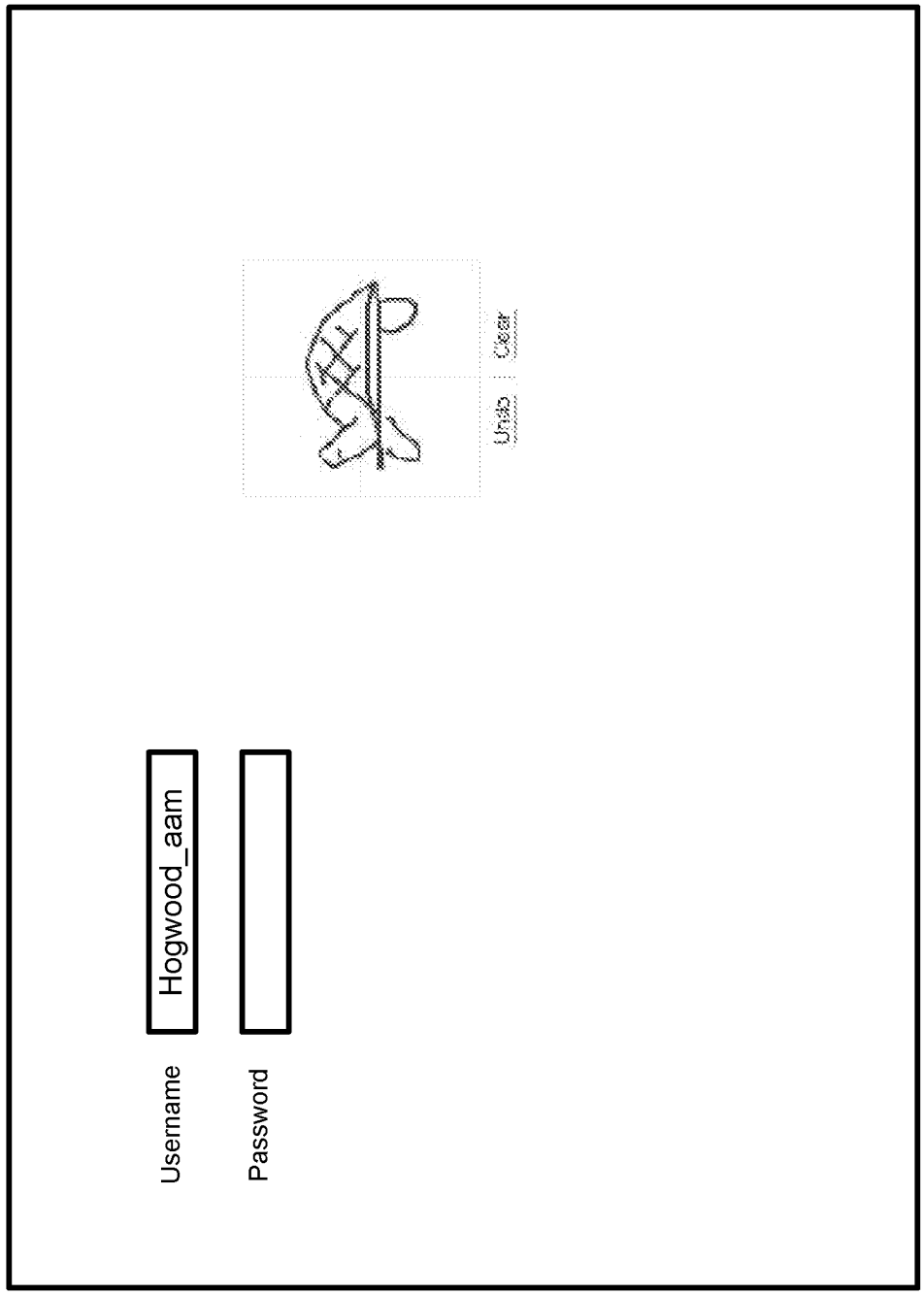

In the embodiment shown in FIG. 4B, the stored password is a drawing of a turtle. The user authentication module 2015 may abstract essential features of the stored drawing, and a drawing drawn by a user with his mouse may be determined as matching the stored drawing as long as it has these essential features, and may not have to be exactly the same as the stored drawing.

To protect the user's password, the user authentication module 2015 may temporarily stop translating the mouse's movements into motion of a pointer on the display 1021 of the user terminal 102n. Instead, one or more black dots may appear in a password box on the login page.

If the pattern drawn by the user with graphical mouse movements does not match the stored password, at 306, the Internet server 101 may inform the user accordingly.

If the pattern drawn by the user with graphical mouse movements matches the stored password, at 307, the Internet server 101 may log the user into his account.

The user may start online banking. If the user wants to input some confidential information, e.g., if he wants to set up automatic payments and needs to input his credit card number, he may move his mouse to "write" such information. At 308, the mouse movement recognition module 2013 may receive graphical mouse movement data and provide the data to the banking module 2014.

The invention provides a low cost, convenient method for enhanced security for online transactions, since it may elude keyloggers without dedicated hardware.

Figure 5:
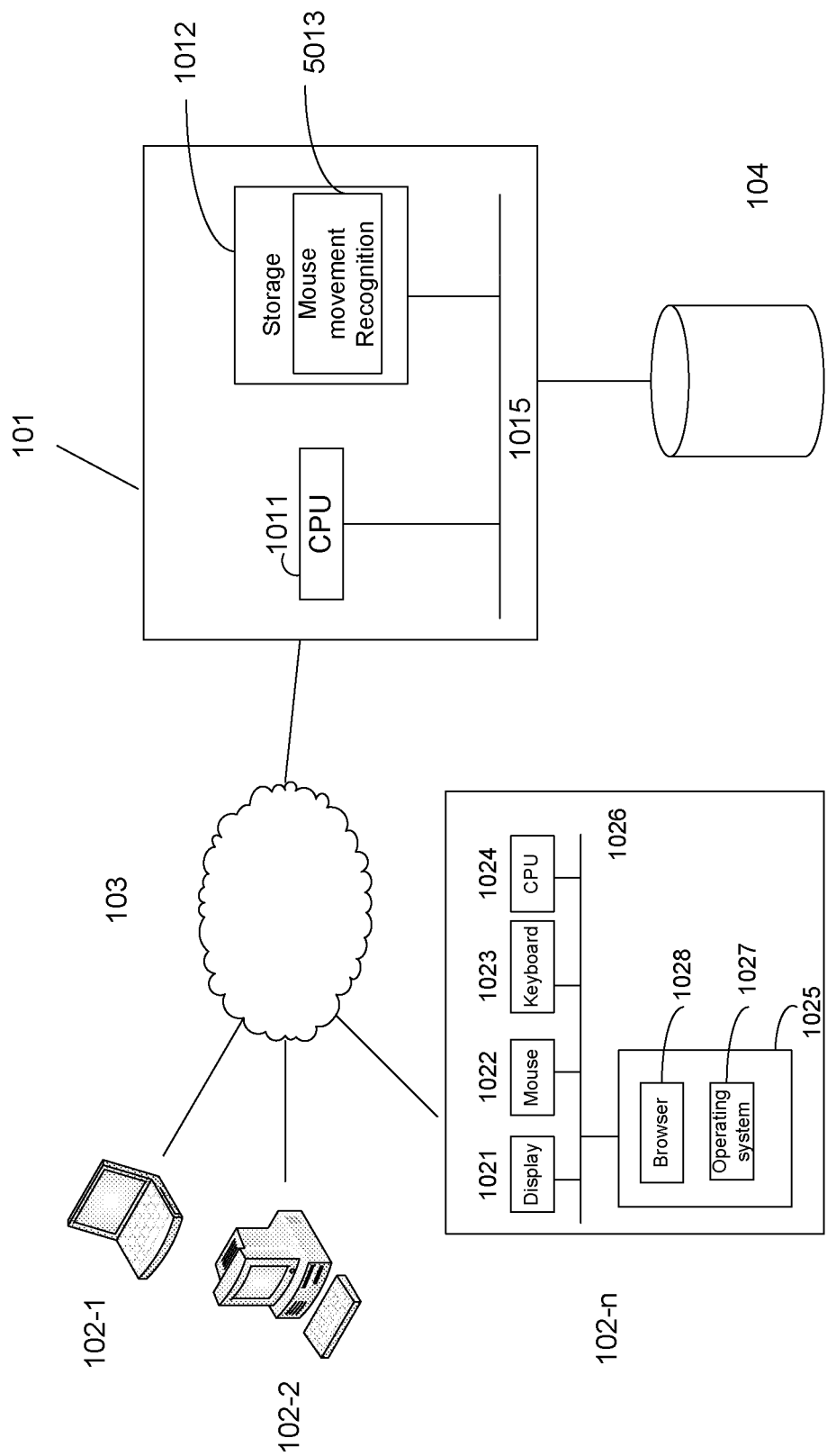
FIG. 5 illustrates a system which interacts with users via graphical mouse movements according to one embodiment of the present invention.

FIG. 5 illustrates an online system which may interact with users via graphical mouse movements according to one embodiment of the present invention. A user may store in the database 104 a symbol drawn with a mouse as a short cut for an operation, e.g., P for "Printing," B for "Back" and O for "Log out." When the user uses his mouse to draw a stored symbol, a mouse movement recognition module 5013 may determine the command the user has drawn, and instruct the CPU 1011 to perform the corresponding operation.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A computer input method, comprising:
   receiving at an Internet server from a remote user terminal a user input which is drawn with graphical movements of a mouse and is a password, the drawn user input including a continuous line;
   protecting the password by stopping translating the graphical movements of the mouse into motion of a pointer on a display when the user input is drawn, wherein a moving path of the pointer is hidden when the moving path is drawn with graphical movements of the mouse;
   responding to the user input;
   receiving at the Internet server a username;
   determining whether the password drawn matches a password previously stored with the username, the previously stored password including a continuous line; and
   authenticating a user in accordance with the determining.

2. The method of claim 1, wherein the password comprises a drawing.

3. The method of claim 1, wherein the password comprises an Asian character.

4. The method of claim 1, wherein the password comprises letters.

5. The method of claim 1, wherein the password comprises numbers.

6. The method of claim 1, wherein the password drawn is determined as matching the stored password as long as the password drawn has essential features of the stored password.

7. The method of claim 3, further comprising:
   determining which character the user input is.

8. The method of claim 1, wherein the user input is a symbol for a shortcut of an operation and the method further comprises: when the user input matches a previously stored symbol, performing an operation associated with the previously stored symbol.

9. The method of claim 1, wherein a series of black dots are shown in a password box instead of graphical movements of a cursor.

10. The method of claim 1, wherein said determining whether the password drawn matches a password previously stored with the username comprises abstracting first essential features of the stored password and second essential features of the drawn password, and comparing the first and second essential features.

11. The method of claim 1, further comprising:
receiving, from the user, an Asian character which is drawn with graphical movements of a mouse;
providing the user one or more Asian characters which are similar to the drawn Asian character, wherein the user selects one of the one or more Asian characters; and
storing the selected Asian character as a stored password.

12. An Internet server, comprising:
a data storage device configured for storing usernames, each stored username associated with a password, wherein a password is drawn with graphical movements of a graphical drawing input device; and
a storage device comprising
a movement recognition module configured for receiving from a remote user terminal a user input drawn with graphical movements of a mouse or graphical movements applied to a touchpad, and
a user authentication module configured for
receiving a username,
receiving a password which is drawn with graphical movements of a mouse or graphical movements applied to a touchpad, the drawn user input including a continuous line,
determining whether the password drawn matches a password that includes a continuous line previously stored in the data storage device with the username, and
authenticating a user in accordance with the determination, wherein the user authentication module protects the password by stopping translating the graphical movements of the mouse or the graphical movements applied to the touchpad into motion of a pointer on a display when the user input is drawn, wherein a moving path of the pointer is hidden when the moving path is drawn with graphical movements of the mouse or graphical movements applied to the touchpad.

13. The Internet server of claim 12, wherein the user authentication module protects the password by not translating the graphical movements of the mouse into motion of a pointer on a display and instead displays a series of dots in a password box.

14. The Internet server of claim 12, wherein said determining whether the password drawn matches a password previously stored with the username comprises abstracting first essential features of the stored password and second essential features of the drawn password, and comparing the first and second essential features.

15. The server of claim 12, wherein the password comprises a drawing.

16. The server of claim 12, wherein the password is selected from a group consisting of an Asian character, letters and numbers.

17. The server of claim 12, wherein the password drawn is determined as matching the stored password as long as the password drawn has essential features of the stored password.

18. The server of claim 12, wherein the user input is a symbol, and when the user input matches a previously stored symbol, the movement recognition module enables an operation associated with the previously stored symbol.

19. A computer program product comprising a non-transitory computer-readable medium having instructions which, when performed by a computer, perform a user authentication method, said method comprising:
receiving at an Internet server a username;
receiving at the Internet server a password which is drawn with graphical movements applied to a touchpad, the graphical movements including a continuous line;
protecting the password by stopping translating the graphical movements applied to the touchpad into motion of a pointer on a display when the password is drawn, wherein a moving path of the pointer is hidden when the moving path is drawn with graphical movements applied to the touchpad;
determining whether the password drawn matches a password previously stored with the username, the previously stored password including a continuous line; and
authenticating a user accordingly.

20. The computer program product of claim 19, wherein a series of black dots are shown in a password box instead of graphical movements of a cursor.

* * * * *